United States Patent
Pope

[11] Patent Number: 6,065,275
[45] Date of Patent: May 23, 2000

[54] WEED TRIMMER WHEELED TRANSPORT ASSEMBLY

[76] Inventor: Stella S. Pope, 3207 Bent Creek Dr., Woodward, Okla. 73801

[21] Appl. No.: 09/204,450

[22] Filed: Dec. 3, 1998

[51] Int. Cl.[7] ................................................ A01D 34/84
[52] U.S. Cl. ......................... 56/12.7; 280/47.24; 172/358
[58] Field of Search ................................ 56/12.7, 16.7, 56/17.2, 17.5; 30/276; 280/47.24; 172/41, 42, 13, 14, 15, 17, 354, 358; D34/24, 12, 27; 37/265, 285; 403/96, 97

[56] References Cited

U.S. PATENT DOCUMENTS

| | | | |
|---|---|---|---|
| D. 143,329 | 12/1945 | Leanard | 280/47.24 X |
| 2,555,226 | 5/1951 | Draughn . | |
| 4,531,350 | 7/1985 | Hutchmacher | 56/17.5 |
| 4,922,694 | 5/1990 | Emoto | 56/16.7 |
| 5,092,112 | 3/1992 | Buckendorf, Jr. | 56/17.5 |
| 5,450,715 | 9/1995 | Murray | 56/17.5 X |
| 5,477,665 | 12/1995 | Stout | 56/16.7 |
| 5,484,154 | 1/1996 | Ward | 280/47.24 X |
| 5,626,006 | 5/1997 | Fricke, Sr. | 56/6.7 X |
| 5,836,142 | 11/1998 | Maxwell | 56/12.1 |

OTHER PUBLICATIONS

Brochure advertisement illustrating "Lawn Trimmer Caddy". Publisher and date unknown.

*Primary Examiner*—H. Shackelford

[57] ABSTRACT

A weed trimmer transportation system is provided including an upper portion having a rigid substantially linear tube including a top end adapted for being coupled to a post of a weed trimmer. Also included is an intermediate portion having a pair of legs each having an inboard end coupled to a bottom end of the upper portion for defining a generally inverted V-shaped configuration. Next provided is a lower portion including an axle coupled to bottom ends of the legs of the intermediate portion and having a pair of wheels mounted thereon.

6 Claims, 4 Drawing Sheets

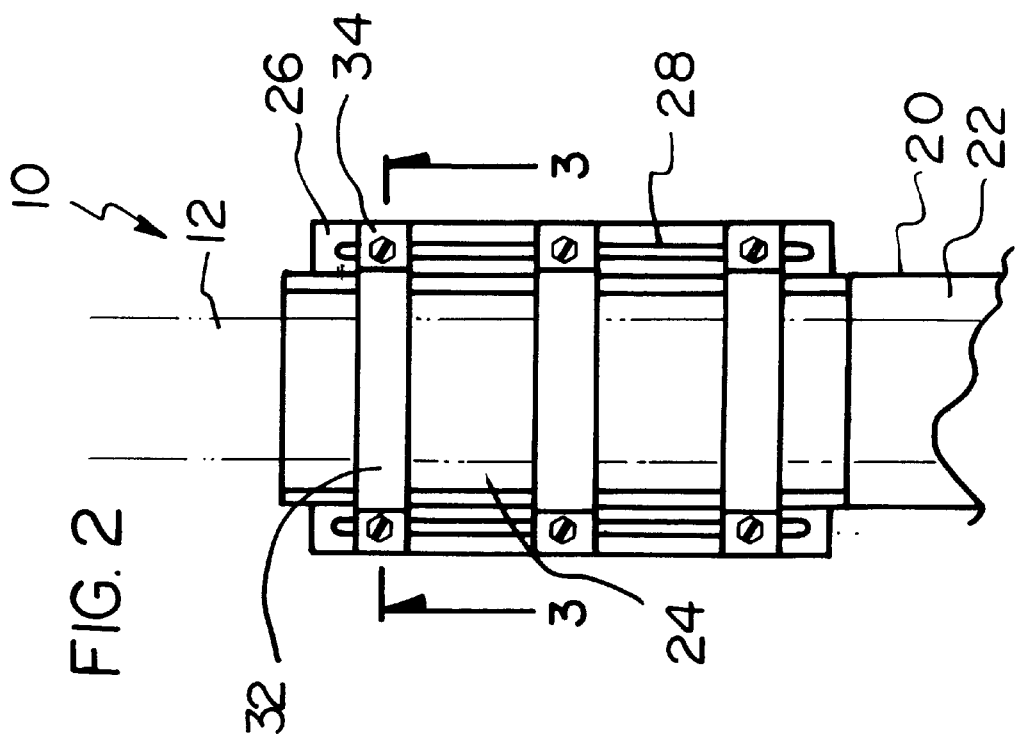
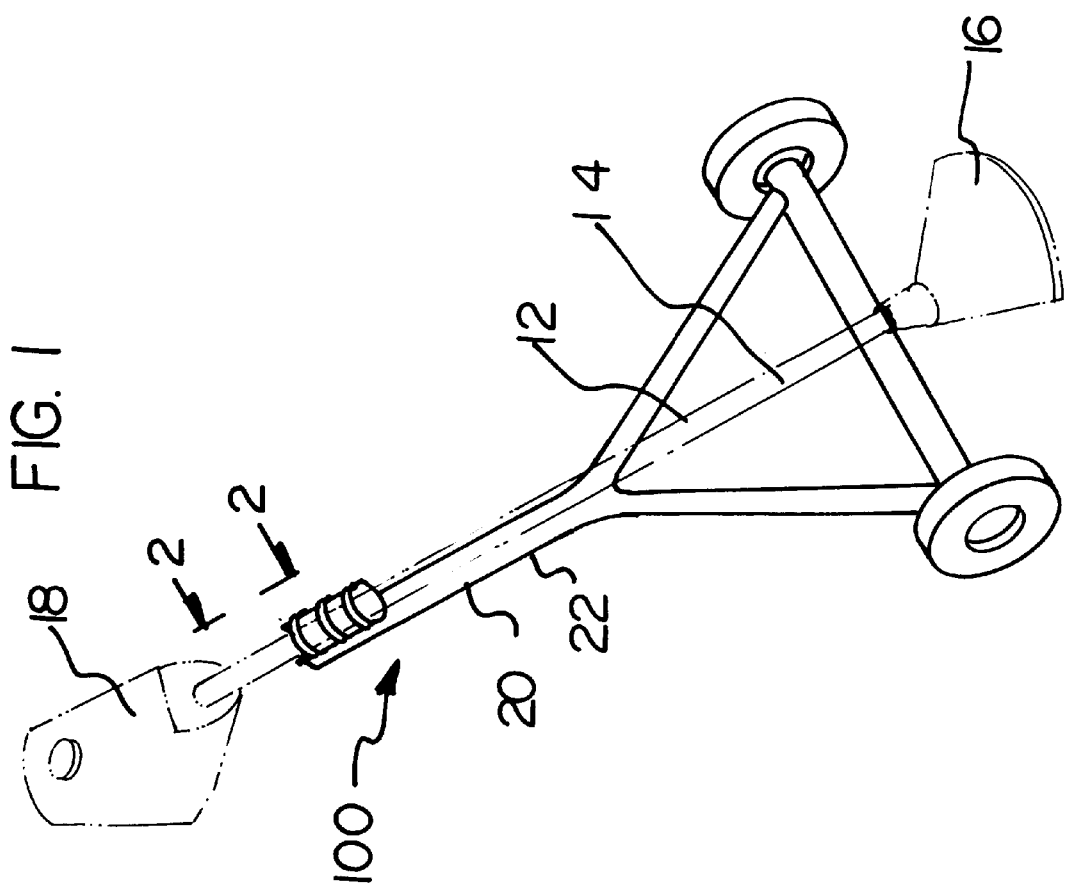

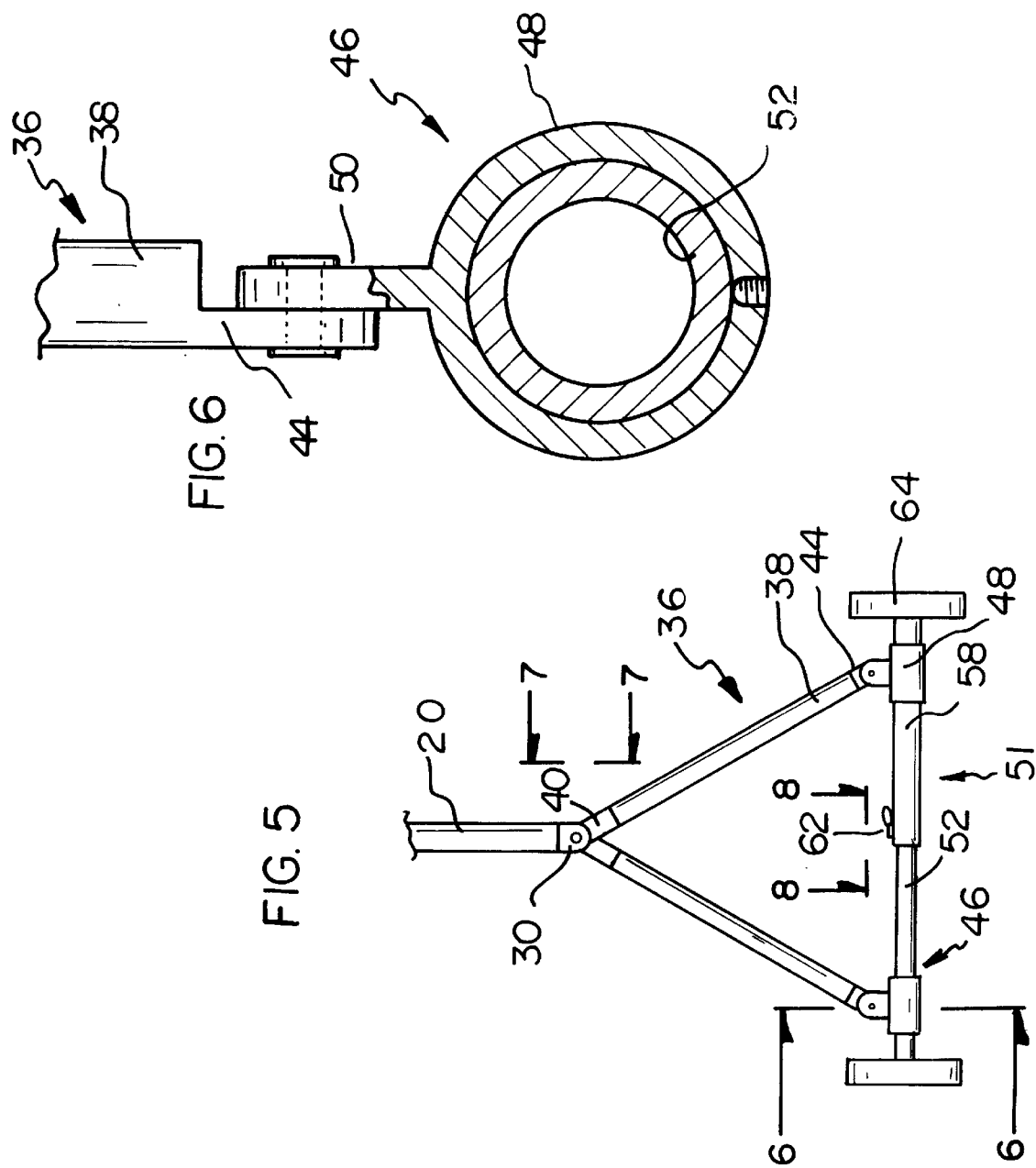

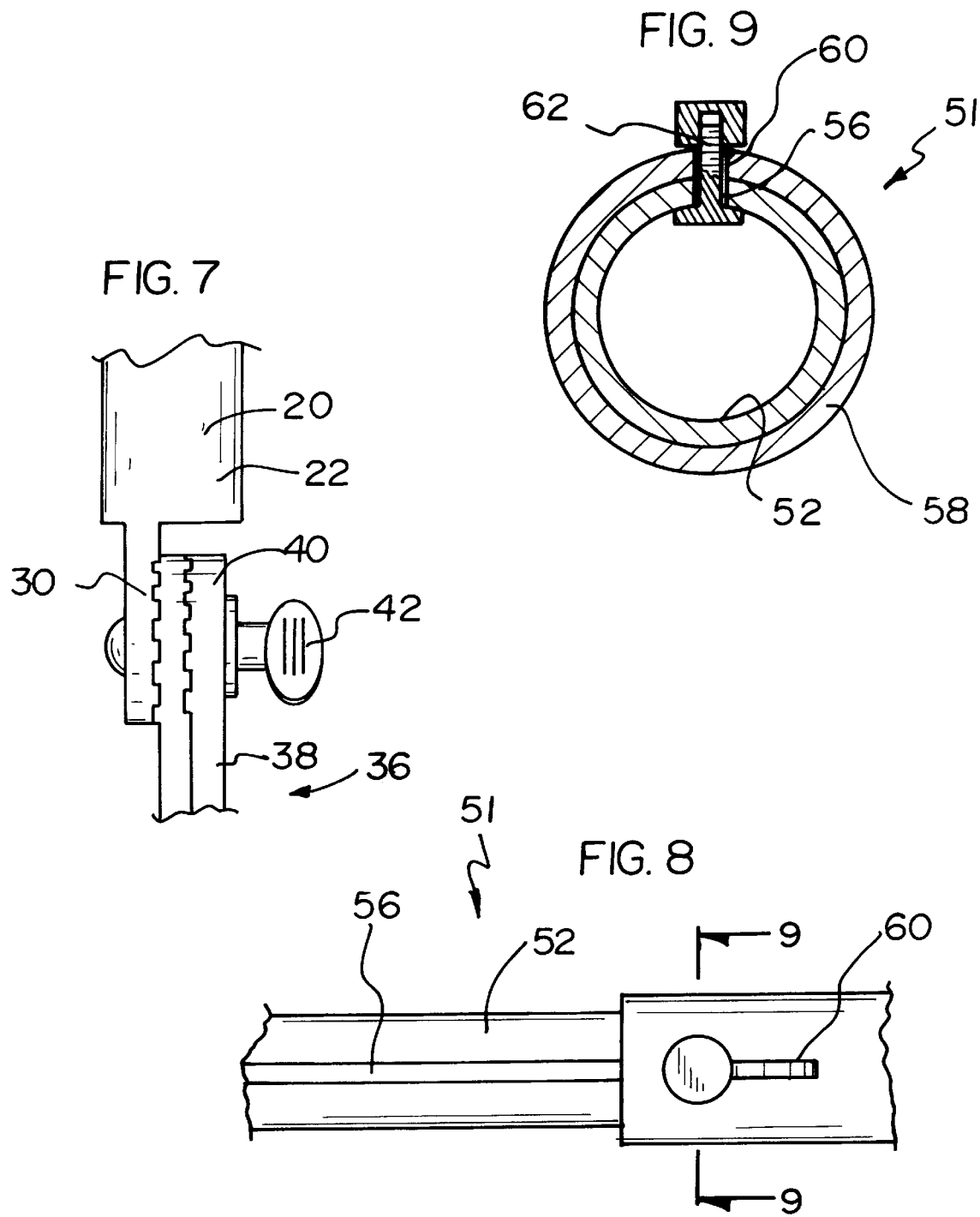

WEED TRIMMER WHEELED TRANSPORT ASSEMBLY

BACKGROUND OF THE INVENTION

1. Field of the Invention

The present invention relates to weed trimmers and more particularly pertains to a new weed trimmer wheeled transport assembly for conveniently transporting a weed trimmer during use.

2. Description of the Prior Art

The use of weed trimmers is known in the prior art. More specifically, weed trimmers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,922,694; 5,626,006; 356,583; 5,092,112; 5,095,687; and 2,730,320.

In these respects, the weed trimmer wheeled transport assembly according to the present invention substantially departs from the conventional concepts and designs of the prior art, and in so doing provides an apparatus primarily developed for the purpose of conveniently transporting a weed trimmer.

SUMMARY OF THE INVENTION

In view of the foregoing disadvantages inherent in th, known types of weed trimmers now present in the prior art, the present invention provides a new weed trimmer wheeled transport assembly construction wherein the same can be utilized for conveniently transporting a weed trimmer.

The general purpose of the present invention, which will be described subsequently in greater detail, is to provide a new weed trimmer wheeled transport assembly apparatus and method which has many of the advantages of the weed trimmers mentioned heretofore and many novel features that result in a new weed trimmer wheeled transport assembly which is not anticipated, rendered obvious, suggested, or even implied by any of the prior art weed trimmers, either alone or in any combination thereof, To attain this, the present invention is adapted for use with a weed trimmer having an elongated linear post with a cylindrical configuration. The linear post has a bottom end with a line dispensing disk rotatably mounted thereon and a top end with a motor mounted thereon. In use, the motor serves for rotating the line dispensing disk. Next provided is an upper portion including a rigid linear tube having a length equal to about ½ that of The post of the weed trimmer. The tube of the upper portion is further equipped with a diameter greater than that of the post of the weed trimmer. As shown in FIG. 2, the upper portion includes a top end having an open top face thus defining a pair of free side edges. Such side edges arc equipped with substantially planar rectangular lips integrally coupled thereto and extending therefrom in coplanar relationship. Each of the lips has an elongated slot formed along a length thereof. For reasons that will soon become apparent, the upper portion further includes a bottom end with a corrugated strip extending therefrom and with an aperture formed therein. Next provided is a plurality of brackets each having an inverted U-shaped configuration. As shown in FIG. 3, the brackets are each equipped with a pair of ends having apertured tabs coupled thereto and extending therefrom. Such tabs are adapted for being bolted to the slots of the upper portion to couple the same to the post of the weed trimmer along an upper half thereof, as shown in FIG. 2. As best shown in FIG. 5, an intermediate portion includes a pair of rigid linear legs each having a length equal to that of the upper portion. The legs of the intermediate portion each have an inboard end with a corrugated strip extending therefrom having an aperture formed therein. The corrugated strips of the legs are thus adapted for being pivotally coupled to the corrugated strip of the upper portion. By such coupling, the legs pivot about an axis in perpendicular relationship with the upper portion and within a plane including the upper portion. It should be noted that each of the legs of the intermediate portion further includes an outboard end with a substantially planar strip extending therefrom having an aperture formed therein. Also included is a pair of sleeve assemblies each having a cylinder with a substantially planar strip coupled to a periphery thereof and extending therefrom with an aperture formed therein. The planar strip is positioned within a plane that contains an axis of the cylinder. The planar strips of the sleeve assemblies are each rotatably coupled to the planar strip of the outboard end of one of the legs of the intermediate portion. For reasons that will become apparent hereinafter, the cylinder of a first one of the sleeve assemblies has a first diameter and the cylinder of a second one of the sleeve assemblies has a second diameter greater than the first diameter. Finally, a lower portion includes a rigid hollow first tube having the first diameter and an elongated slot formed therein along a length thereof. Associated therewith is a rigid hollow second tube having the second diameter and an opening formed therein. As shown in FIGS. 6 & 9, the second tube telescopingly receives the first tube. Further, a set screw is coupled between the slot of the first tube and the opening of the second tube for selectively fixing a combined length thereof. Wheels are rotatably mounted to ends of the tubes of the lower portion. For accommodating the variable length of the tubes of the lower portion, the sleeves slidably receive the same.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new weed trimmer wheeled transport assembly apparatus and method which has many of the advantages of the weed trimmers mentioned heretofore and many novel features that result in a new weed trimmer wheeled transport assembly which is not anticipated, rendered obvious, suggested, or even implied by any of the prior art weed trimmers, either alone or in any combination thereof.

It is another object of the present invention to provide a new weed trimmer wheeled transport assembly which may be easily and efficiently manufactured and marketed.

It is a further object of the present invention to provide a new weed trimmer wheeled transport assembly which is of a durable and reliable construction.

An even further object of the present invention is to provide a new weed trimmer wheeled transport assembly which is susceptible of a low cost of manufacture with regard to both materials and labor, and which accordingly is then susceptible of low prices of sale to the consuming public, thereby making such weed trimmer wheeled transport assembly economically available to the buying public.

Still yet another object of the present invention is to provide a new weed trimmer wheeled transport assembly which provides in the apparatuses and methods of the prior art some of the advantages thereof, while simultaneously overcoming some of the disadvantages normally associated therewith.

Still another object of the present invention is to provide a new weed trimmer wheeled transport assembly for conveniently transporting a weed trimmer.

Even still another object of the present invention is to provide a new weed trimmer wheeled transport assembly that include an upper portion having a rigid substantially linear tube including a top end adapted for being coupled to a post of a weed trimmer. Also included is an intermediate portion having a pair of legs each having an inboard end coupled to a bottom end of the upper portion for defining a generally inverted V-shaped configuration. Next provided is a lower portion including an axle coupled to bottom ends of the legs of the intermediate portion and having a pair of wheels mounted thereon.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an alternate embodiment of the present invention.

FIG. 2 is a top view of the coupling of the weed trimmer and the upper portion of the present invention.

FIG. 5 is a top view of the present invention.

FIG. 6 is a cross-sectional view of the lower portion of the present invention taken along line 6—6 shown in FIG. 5.

FIG. 7 is a side view of the coupling between the upper portion and the legs of the intermediate portion of the present invention.

FIG. 8 is a top view of the tubes of the lower portion of the present invention.

FIG. 9 is a cross-sectional view of the tubes of the lower portion of the present invention taken along line 9—9 shown in FIG. 8.

DESCRIPTION OF THE PREFERRED EMBODIMENT

Figure 3:
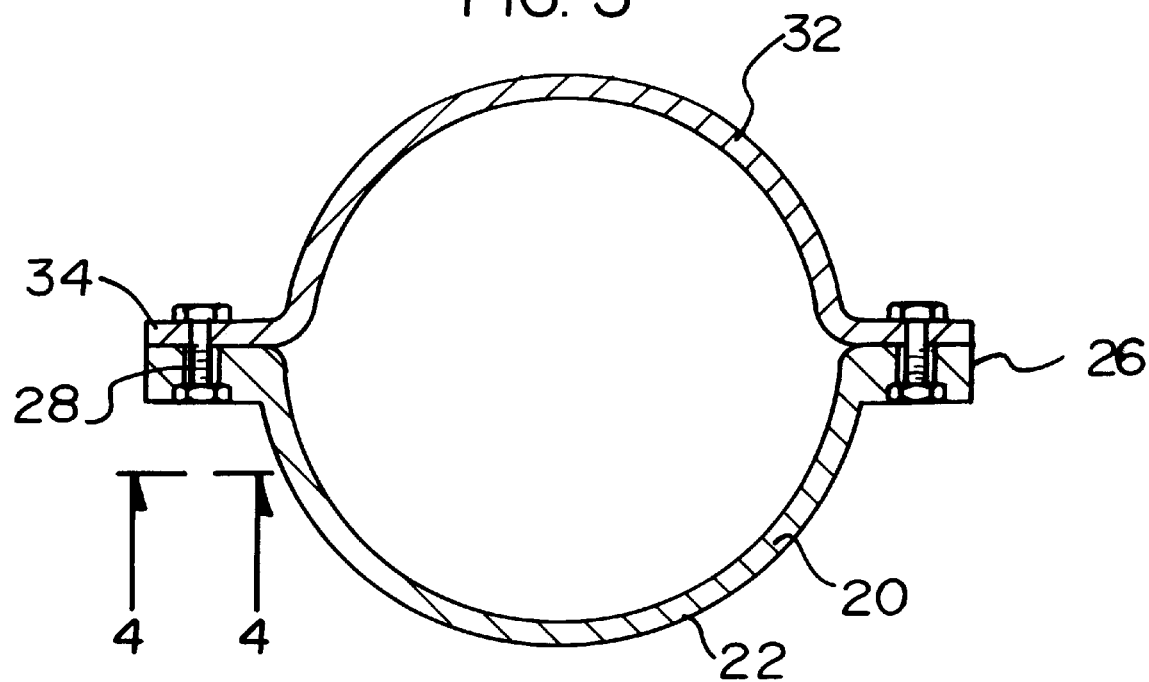
FIG. 3 is a side cross-sectional view of the present invention taken along line 3—3 shown in FIG. 2.
Figure 4:
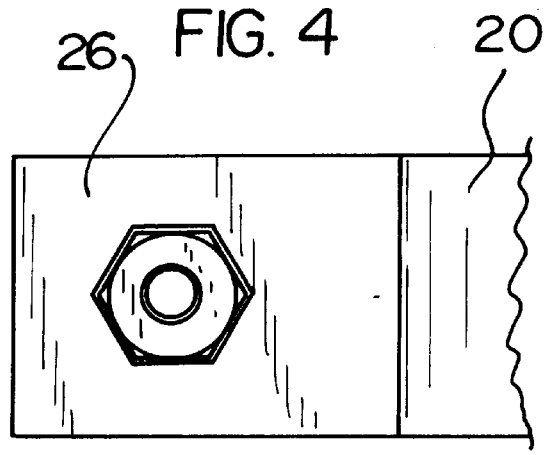
FIG. 4 is a bottom view of the coupling of the brackets and upper portion of the present invention as shown in FIG. 3.

With reference now to the drawings, and in particular to FIGS. 1 through 9 thereof, a new weed trimmer wheeled transport assembly embodying the principles and concepts of the present invention and generally designated by the reference numeral 10 will be described.

The present invention, designated as numeral 10, is adapted for use with a weed trimmer 12 having an elongated linear post 14 with a cylindrical configuration. The linear post has a bottom end with a line dispensing disk 16 rotatably mounted thereon and a top end with a motor 18 mounted thereon. In use, the motor serves for rotating the line dispensing disk.

Next provided is an upper portion 20 including a rigid linear tube 22 having a length equal to about ½ that of the post of the weed trimmer. The tube of the upper portion is further equipped with a diameter greater than that of the post of the weed trimmer. As shown in FIG. 2, the upper portion includes a top end having an open top face 24 thus defining a pair of free side edges. Such side edges are equipped with substantially planar rectangular lips 26 integrally coupled thereto and extending therefrom in coplanar relationship. Each of the lips has an elongated slot 28 formed along a length thereof. For reasons that will soon become apparent, the upper portion further includes a bottom end with a corrugated strip 30 extending therefrom and with an aperture formed therein.

Next provided is a plurality of brackets 32 each having an inverted U-shaped configuration. As shown in FIG. 3, the brackets are each equipped with a pair of ends having apertured tabs 34 coupled thereto and extending therefrom. Such tabs are adapted for being bolted to the slots of the upper portion to couple the same to the post of the weed trimmer along an upper half thereof, as shown in FIG. 2. Ideally, the bolts each include a nut which is positioned within an elongated recess formed in a bottom surface of one of the lips of the upper portion and along the associated slot. It should be noted that the upper portion may be adapted to encompass the post of the weed trimmer. In the alternative, the upper portion may be positioned below the post of the weed trimmer in parallel relationship therewith.

As best shown in FIG. 5, an intermediate portion 36 includes a pair of rigid linear legs 38 each having a length equal to that of the upper portion. The legs of the intermediate portion each have an inboard end with a corrugated strip 40 extending therefrom having an aperture formed therein. The corrugated strips of the legs are thus adapted for being pivotally coupled to the corrugated strip of the upper portion. By such coupling, the legs pivot about an axis in perpendicular relationship with the upper portion and within a plane including the upper portion. As an option, the legs may be angled downwardly with respect to the upper portion. Ideally, a wing nut 42 is provided for selectively engaging teeth of the corrugated strips, thereby fixing the legs at a selected angled. It should be noted that each of the legs of the intermediate portion further includes an outboard end with a substantially planar strip 44 extending therefrom having an aperture formed therein.

Also included is a pair of sleeve assemblies 46 each having a cylinder 48 with a substantially planar strip 50 coupled to a periphery thereof and extending therefrom with an aperture formed therein. Ideally, the planar strip is positioned within a plane that contains an axis of the cylinder. The planar strips of the sleeve assemblies are each rotatably coupled to the planar strip of the outboard end of one of the legs of the intermediate portion. For reasons that will become apparent hereinafter, the cylinder of a first one of the sleeve assemblies has a first diameter and the cylinder of a second one of the sleeve assemblies has a second diameter greater than the first diameter.

Finally, a lower portion 51 includes a rigid hollow first tube 52 having the first diameter and an elongated slot 56 formed therein along a length thereof. Associated therewith is a rigid hollow second tube 58 having the second diameter and an opening 60 formed therein. As shown in FIGS. 6 & 9, the second tube telescopingly receives the first tube. Further, a set screw 62 is coupled between the slot of the first tube and the opening of the second tube for selectively fixing a combined length thereof. As shown in FIG. 9, the set screw preferably includes a T-shaped bolt with a head that engages an inner surface of the first tube and a nut which may be tightened against an outer surface of the second tube. 8–10 inch rubber wheels 64 are rotatably mounted to ends of the tubes of the lower portion. For accommodating the variable length of the tubes of the lower portion, the sleeves slidably receive the same. In the preferred embodiment, each of the sleeves has a set screw that is threadedly engaged within a threaded bore formed in a bottom apex thereof for selectively engaging the associated tube of the lower portion.

In use, the line dispensing disk of the weed trimmer extends forwardly with respect to the lower portion. As such, the weed trimmer may be conveniently transported. In an alternate embodiment 100, as shown in FIG. 1, the various couplings between the upper, intermediate, and lower portions may be integrally fixed to afford a unitary device.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those ski led in the art, it is not desired to limit the invention to the exact construction and operation shown and described, and accordingly, all suitable modifications and equivalents may be resorted to, falling within the scope of the invention.

I claim:

1. A weed trimmer transportation system comprising, in combination:

a weed trimmer including an elongated linear post with a cylindrical configuration having a bottom end with a line dispensing disk rotatably mounted thereon and a top end with a motor mounted thereon for rotating the line dispensing disk;

an upper portion including a rigid linear tube having a length equal to about ½ that of the post of the weed trimmer and a diameter greater than that of the post of the weed trimmer, the upper portion including a top end having an open top face thus defining a pair of free side edges having substantially planar rectangular lips integrally coupled thereto and extending therefrom in coplanar relations hip and each having an elongated slot formed along a length thereof, the upper portion further including a bottom end with a corrugated strip extending therefrom with an aperture formed therein;

a plurality of brackets each having an inverted U-shaped configuration with a pair of ends having apertured tabs coupled thereto and extending therefrom in coplanar relationship for being bolted to the slots of the upper portion to couple the same to the post of the weed trimmer along an upper half thereof;

an intermediate portion including a pair of rigid linear legs each having a length equal to that of the upper portion, the legs each having an inboard end with a corrugated strip extending therefrom having an aperture formed therein for being pivotally coupled to the corrugated strip of the upper portion such that the legs pivot about an axis in perpendicular relationship with the upper portion and within a plane including the upper portion, each of the legs of the intermediate portion further including an outboard end with a substantially planar strip extending therefrom having an aperture formed therein;

a pair of sleeve assemblies each including, a cylinder with a substantially planar strip coupled to a periphery thereof and extending therefrom with an aperture formed therein, the planar strip being positioned within a plane that contains an axis of the cylinder, the planar strips of the sleeve assemblies each being rotatably coupled to the planar strip of the outboard end of one of the legs of the intermediate portion, where in the cylinder of a first one of the sleeve assemblies has a first diameter and the cylinder of a second one of the sleeve assemblies has a second diameter greater than the first diameter; and a lower portion including a rigid hollow first tube having the first diameter and an elongated slot formed therein along a length thereof a rigid hollow second tube having the second diameter and an opening formed therein wherein the second tube telescopingly receives the first tube, a set screw coupled between the slot of the first tube and the opening of the second tube for selectively fixing a combined length thereof, and wheels rotatably mounted to ends of the tubes of the lower portion, wherein the tubes of the lower portion are slidably received within the sleeves;

wherein the line dispensing disk of the weed trimmer extends forwardly with respect to the lower portion such that the weed trimmer may be transported.

2. A weed trimmer transportation system adapted for use with a weed trimmer including an elongated linear post with a cylindrical configuration having a bottom end with a line dispensing, disk rotatably mounted thereon and a top end with a motor mounted thereon for rotating the line dispensing disk, the system comprising:

an upper portion including a rigid substantially linear tube including a top end adapted for being coupled to the post of the weed trimmer;

an intermediate portion including a pair of legs each having an inboard end coupled to a bottom end of the upper portion for defining a generally inverted V-shaped configuration, each of the legs having an outboard end with a sleeve mounted thereon; and a lower portion including an axle including a first segment and a second segment, the second segment having an opening telescopically receiving a portion of the first segment, a wheel being rotatably mounted on each of the segments at a free end of the segments, means for selectively fixing the position of the first segment with respect to the second segment for adjusting the distance between the wheel mounted on the first segment and the wheel mounted on the second segment, the segments of the lower portion being slidably received in the sleeves of the lets.

3. A weed trimmer transportation system as set forth in claim 2 wherein the legs are pivotally coupled to the upper portion.

4. A weed trimmer transportation system as set forth in claim 3 wherein each of the sleeves are pivotally coupled to one of the outboard ends of the legs.

5. A weed trimmer transportation system as set forth in claim 2 wherein the upper portion is mountable to the post of the weed trimmer by way of a plurality of U-shaped brackets.

6. A weed trimmer transportation system for moving a weed trimmer across a ground surface, the weed trimmer including an elongated post, a rotatable head mounted on a bottom end of the post and having a line extending therefrom, and a motor mounted on a top end of the post for rotating the head, the system comprising:

an upper portion including a shaft, the upper portion including a top end and a bottom end, the top end forming an open channel for receiving a portion of the post of the weed trimmer, a pair of side edges each being located on one side of the channel, the upper portion further including a bottom end with a corrugated strip extending therefrom with an aperture formed therein;

at least one bracket having a substantially U-shaped configuration with a pair of ends, each of the pair of ends being removably mounted to the side edges of the channel of the upper portion for securing the portion of the post of the weed trimmer in the channel of the upper portion;

an intermediate portion including a pair of legs, each of the legs having an inboard end, said inboard end having a corrugated strip pivotally coupled to the corrugated strip at the bottom end of the upper portion such that the legs are selectively pivotable about an axis perpendicular to the longitudinal axis of the upper portion, each of the legs of the intermediate portion further including an outboard end, a sleeve being pivotally mounted on the outboard end of each of the legs; and a lower portion including a first tube, a second tube having an opening formed therein wherein the second tube telescopically receives a portion of the first tube, a wheel being rotatably mounted on each of the tubes at a free end thereof, means for selectively fixing the position of the first tube with respect to the second tube for adjusting the distance between the wheel mounted oil the first tube and the wheel mounted on the second tube, the tubes of the lower portion being slidably received in the sleeves of the legs.

\* \* \* \* \*